(12) United States Patent
Kamiya et al.

(10) Patent No.: US 10,006,491 B2
(45) Date of Patent: Jun. 26, 2018

(54) SLIDE BEARING

(71) Applicant: Taiho Kogyo Co., Ltd., Toyota-shi, Aichi (JP)

(72) Inventors: Shuu Kamiya, Toyota (JP); Yuichiro Kajiki, Toyota (JP); Keiji Yuda, Toyota (JP); Yasushi Nakatake, Toyota (JP)

(73) Assignee: Taiho Kogyo Co., Ltd., Toyota-shi, Aichi (JP)

( * ) Notice: Subject to any disclaimer, the term of this patent is extended or adjusted under 35 U.S.C. 154(b) by 0 days. days.

(21) Appl. No.: 15/112,399

(22) PCT Filed: Feb. 4, 2015

(86) PCT No.: PCT/JP2015/053132
§ 371 (c)(1),
(2) Date: Jul. 18, 2016

(87) PCT Pub. No.: WO2015/122332
PCT Pub. Date: Aug. 20, 2015

(65) Prior Publication Data
US 2016/0333931 A1 Nov. 17, 2016

(30) Foreign Application Priority Data
Feb. 14, 2014 (JP) .................. 2014-027005

(51) Int. Cl.
*F16C 33/10* (2006.01)
*F16C 9/02* (2006.01)
*F16C 17/02* (2006.01)

(52) U.S. Cl.
CPC ............ *F16C 33/1065* (2013.01); *F16C 9/02* (2013.01); *F16C 17/022* (2013.01);
(Continued)

(58) Field of Classification Search
CPC .... F16C 9/02; F16C 9/04; F16C 9/045; F16C 17/022; F16C 33/106; F16C 33/1065
See application file for complete search history.

(56) References Cited

U.S. PATENT DOCUMENTS 7,234,870 B2 * 6/2007 Kitahara .................. F16C 9/02
384/288
2005/0196084 A1 9/2005 Kitahara et al.

FOREIGN PATENT DOCUMENTS

DE 102006010698 * 9/2007
EP 1 557 544 7/2005
(Continued)

OTHER PUBLICATIONS

International Search Report (PCT/ISA/210) dated May 12, 2015, by the Japanese Patent Office as the International Searching Authority for International Application No. PCT/JP2015/053132.
(Continued)

*Primary Examiner* — James Pilkington
(74) *Attorney, Agent, or Firm* — Buchanan Ingersoll & Rooney PC

(57) ABSTRACT

There is provided a slide bearing capable of preventing or reducing a temperature increase in lubricant. A cylindrical main bearing is formed by combining a pair of upper bearing and lower bearing and rotatably supports a crank journal. The lower bearing includes a downstream crush relief formed at a downstream end in the rotation direction of the crank journal in an inner periphery of the lower bearing; and an oil groove formed in the inner periphery of the lower bearing so as to communicate with the downstream crush relief.

1 Claim, 11 Drawing Sheets

(52) U.S. Cl.
CPC ...... *F16C 2240/30* (2013.01); *F16C 2240/42* (2013.01); *F16C 2360/22* (2013.01)

(56) References Cited

FOREIGN PATENT DOCUMENTS

| JP | 07-139539 A | 5/1995 |
|---|---|---|
| JP | 07-217639 A | 8/1995 |
| JP | 2005-249024 A | 9/2005 |
| JP | 2010-84778 A | 4/2010 |

OTHER PUBLICATIONS

Written Opinion (PCT/ISA/237) dated May 12, 2015, by the Japanese Patent Office as the International Searching Authority for International Application No. PCT/JP2015/053132.

Extended European Search Report issued in corresponding European Patent Application No. 15748758.8, dated Sep. 11, 2017 (8 pages).

\* cited by examiner

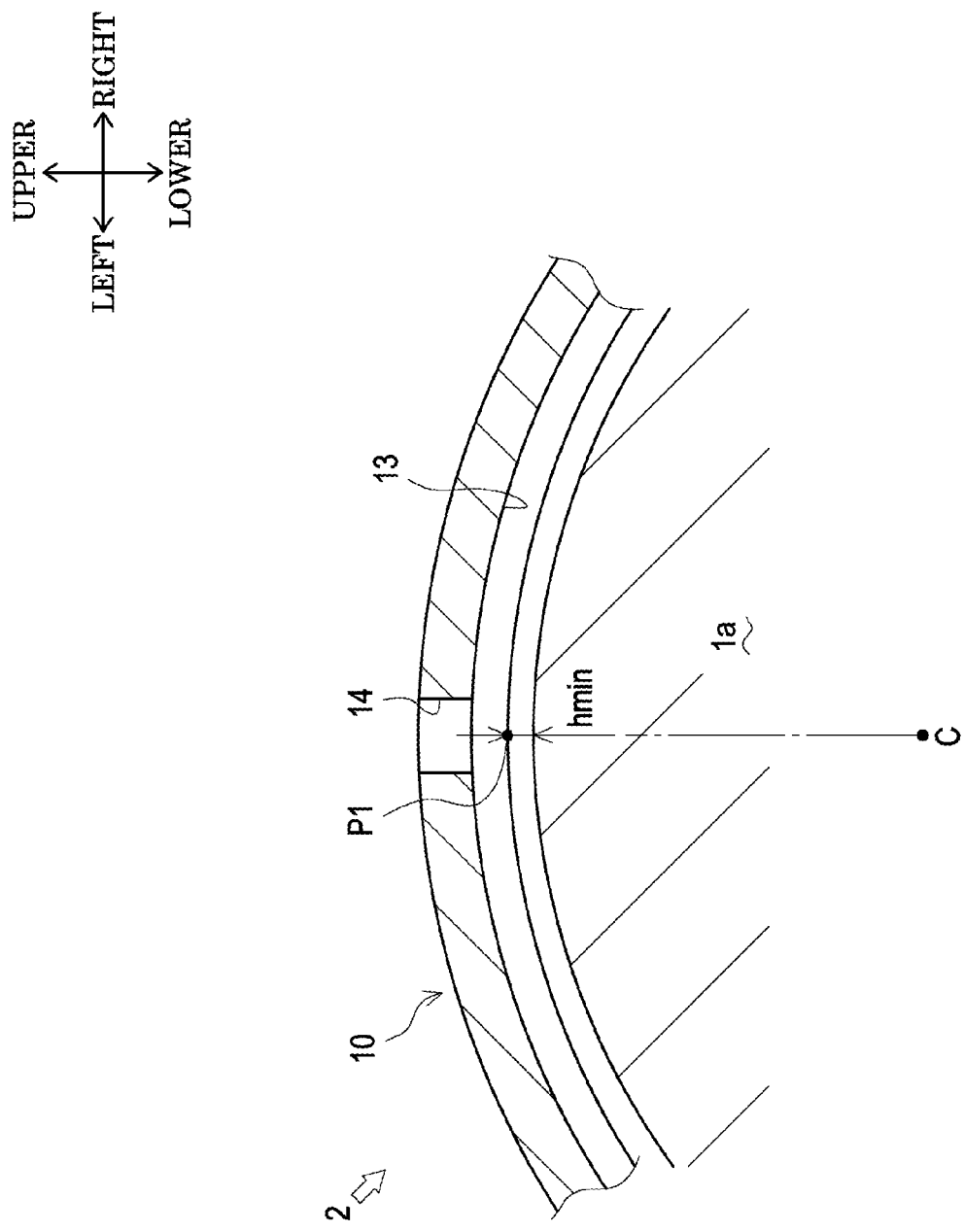

SLIDE BEARING

TECHNICAL FIELD

The present invention relates to a technique for a cylindrical slide bearing that is formed by combining a pair of semi-cylindrical bearings and rotatably supports a shaft member.

BACKGROUND ART

Conventionally, a technique for a cylindrical slide bearing that is formed by combining a pair of semi-cylindrical bearings and rotatably supports a shaft member has been known. Such a technique is disclosed, for example, in Patent Literature 1.

A split slide bearing (semi-cylindrical bearing) disclosed in Patent Literature 1 includes crush reliefs formed at both ends of its inner periphery, an oil groove formed to extend from the vicinity of one crush relief to the vicinity of the other crush relief, and inflow inhibiting portions that are formed between the oil groove and the respective crush reliefs and prevent lubricant in the oil groove from flowing into the crush reliefs.

In such a slide bearing, the inflow inhibiting portion intervenes between the oil groove and the crush relief so that they communicate with each other. Therefore, the amount of lubricant leaking from the oil groove to the outside of the slide bearing through the crush relief can be reduced. This allows the lubricant in the oil groove to be sufficiently fed to the inner periphery of the slide bearing and prevents or reduces the occurrence of failure (galling, wear, etc.) due to an insufficient amount of lubricant.

However, the technique disclosed in Patent Literature 1 is disadvantageous in that since the oil groove is formed to extend over a wide range, i.e., from the vicinity (specifically, within 15 degrees in the circumferential direction of the slide bearing) of one crush relief to the vicinity of the other crush relief, a surface area for receiving a shaft member is reduced, which is likely to cause galling.

CITATION LIST

Patent Literature

Patent Literature 1: JP 2005-249024 A

SUMMARY OF INVENTION

Technical Problem

The present invention has been made in view of the above circumstances, and in order to solve the problem, an object of the present invention is to provide a slide bearing capable of preventing or reducing the likelihood of the occurrence of galling while being provided with an oil groove in its inner periphery.

Solution to Problem

The problem to be solved by the present invention is that as described above and solutions to the problem are then described.

A slide bearing having a cylindrical shape according to one aspect of the present invention includes an upper semi-cylindrical bearing disposed on an upper side and a lower semi-cylindrical bearing disposed on a lower side in combination, and the slide bearing rotatably supports a shaft member through an oil film between the slide bearing and the shaft member. The lower semi-cylindrical bearing includes an oil groove formed in a low-load region set in a range in which a pressure from the oil film is low on an inner periphery of the lower semi-cylindrical bearing.

Preferably, the low-load region is set in a range within a predetermined angle upstream and downstream in a rotation direction of the shaft member with reference to a position that is 180-degree symmetrical to a position at which a thickness of the oil film between an inner periphery of the upper semi-cylindrical bearing and the shaft member is smallest with respect to an axis of the slide bearing.

Preferably, the low-load region is set in a range that is spaced apart from lower crush reliefs formed at both ends of the inner periphery of the lower semi-cylindrical bearing by 16 degrees or more about an axis of the slide bearing.

Advantageous Effects of Invention

The present invention has the following effects.

The slide bearing of the present invention, which is provided with the oil groove in the low-load region, can prevent or reduce the likelihood of the occurrence of galling.

In the slide bearing of the present invention, the low-load region can be set at an appropriate position.

BRIEF DESCRIPTION OF DRAWINGS

FIG. 7 is an enlarged front cross-sectional view showing the vicinity of an upper end of the upper bearing.

DETAILED DESCRIPTION OF PREFERRED EMBODIMENTS

In the following description, vertical (upper-lower), longitudinal (anterior-posterior), and lateral (left-right) directions are defined by the arrows in the figures.

Figure 1:
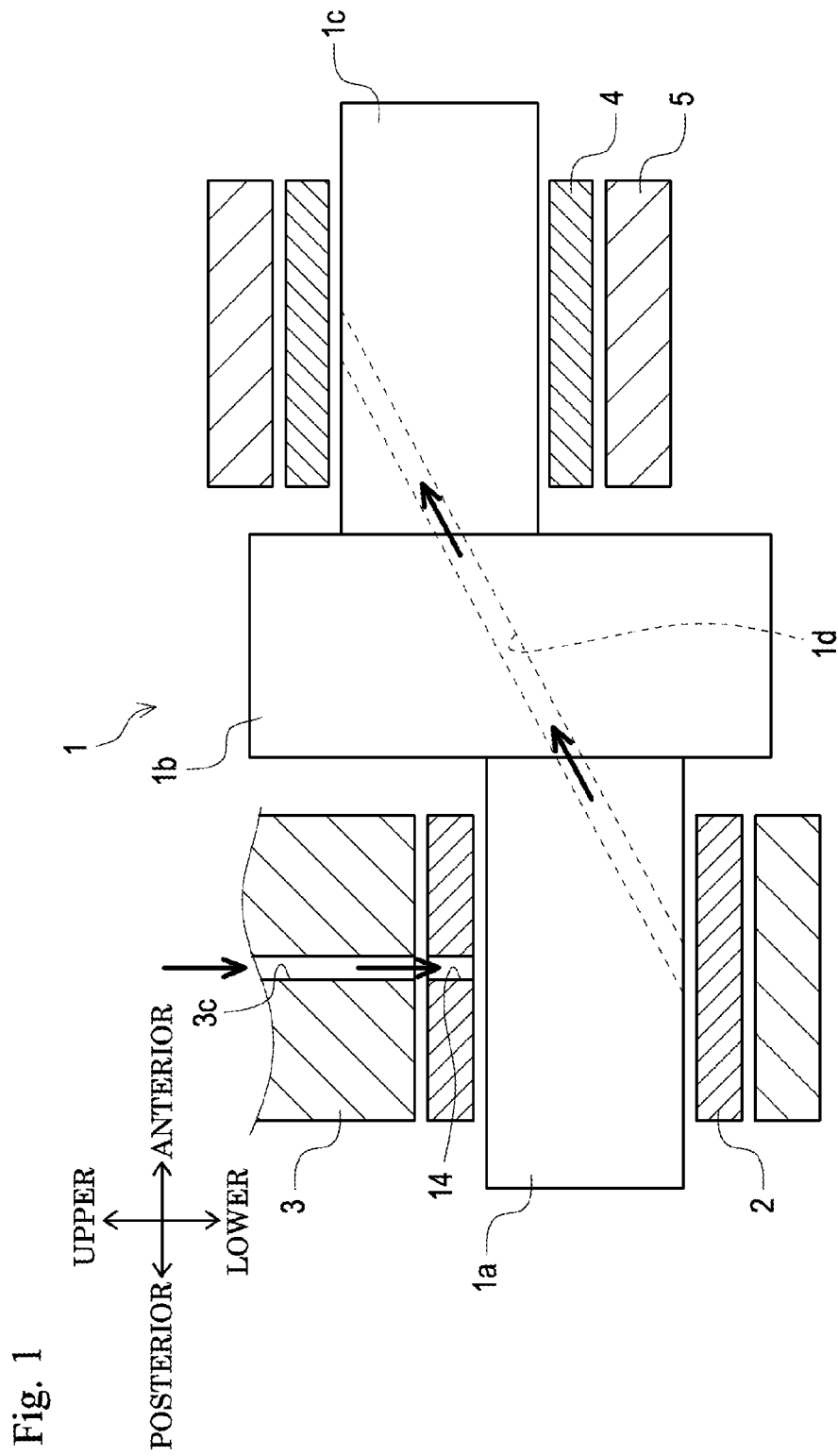
FIG. 1 is a side schematic view showing a schematic structure of a crankshaft.

First, referring to FIG. 1, the structure of a crankshaft 1 on which a main bearing 2 according to one embodiment of a slide bearing according to the present invention is mounted and a lubricant feed mechanism for the crankshaft 1 is schematically described.

The crankshaft 1, a member constituting an internal combustion engine, is to convert reciprocating motion of a piston into rotary motion. The crankshaft 1 mainly includes a crank journal 1a, a crank arm 1b, a crank pin 1c, and a communication oil passage 1d.

The crank journal 1a, which is an embodiment of a shaft member according to the present invention, is rotatably supported by a cylinder block 3 through the main bearing 2. The main bearing 2 is provided with a through-hole 14 communicating between its outer and inner peripheries. The crank pin 1c is connected to the crank journal 1a through the crank arm 1b. The crank pin 1c is rotatably connected to a connecting rod 5 through a connecting rod bearing 4. The communication oil passage 1d is formed in the crankshaft 1 so that the outer periphery of the crank journal 1a communicates with the outer periphery of the crank pin 1c.

In such a configuration, lubricant from a main oil hole (not shown) is fed to the main bearing 2 through a lubricant passage 3c formed in the cylinder block 3. The lubricant is further fed to the inner periphery of the main bearing 2 through the through-hole 14 of the main bearing 2. The lubricant lubricates a sliding surface between the main bearing 2 and the crank journal 1a.

The lubricant fed to the inner periphery of the main bearing 2 is further fed to the outer periphery of the crank pin 1c through the communication oil passage 1d. The lubricant lubricates a sliding surface between the crank pin 1c and the connecting rod bearing 4.

The structure of a portion connecting the crank journal 1a and the cylinder block 3 (i.e., a supporting portion of the crank journal 1a) is described below with reference to FIG. 2.

The cylinder block 3 includes a body-side housing 3a and a cap 3b secured to the bottom of the body-side housing 3a. The lower end surface of the body-side housing 3a is provided with a bearing portion 3d that is semi-circularly recessed as viewed from the front. The upper end surface of the cap 3b is provided with a bearing portion 3e that is semi-circularly recessed as viewed from the front. The crank journal 1a is supported by being sandwiched between the bearing portion 3d and the bearing portion 3e, and the main bearing 2 is interposed between the cylinder block 3 and the crank journal 1a.

In such a configuration, when the crank journal 1a rotates (assuming it rotates clockwise as viewed from the front in the present embodiment), an oil film of lubricant fed through the lubricant passage 3c is formed between the outer periphery of the crank journal 1a and the inner periphery of the main bearing 2. The crank journal 1a is rotatably supported by the cylinder block 3 through the oil film.

The structure of the main bearing 2 is described below in detail with reference to FIGS. 2 through 6.

Figure 2:
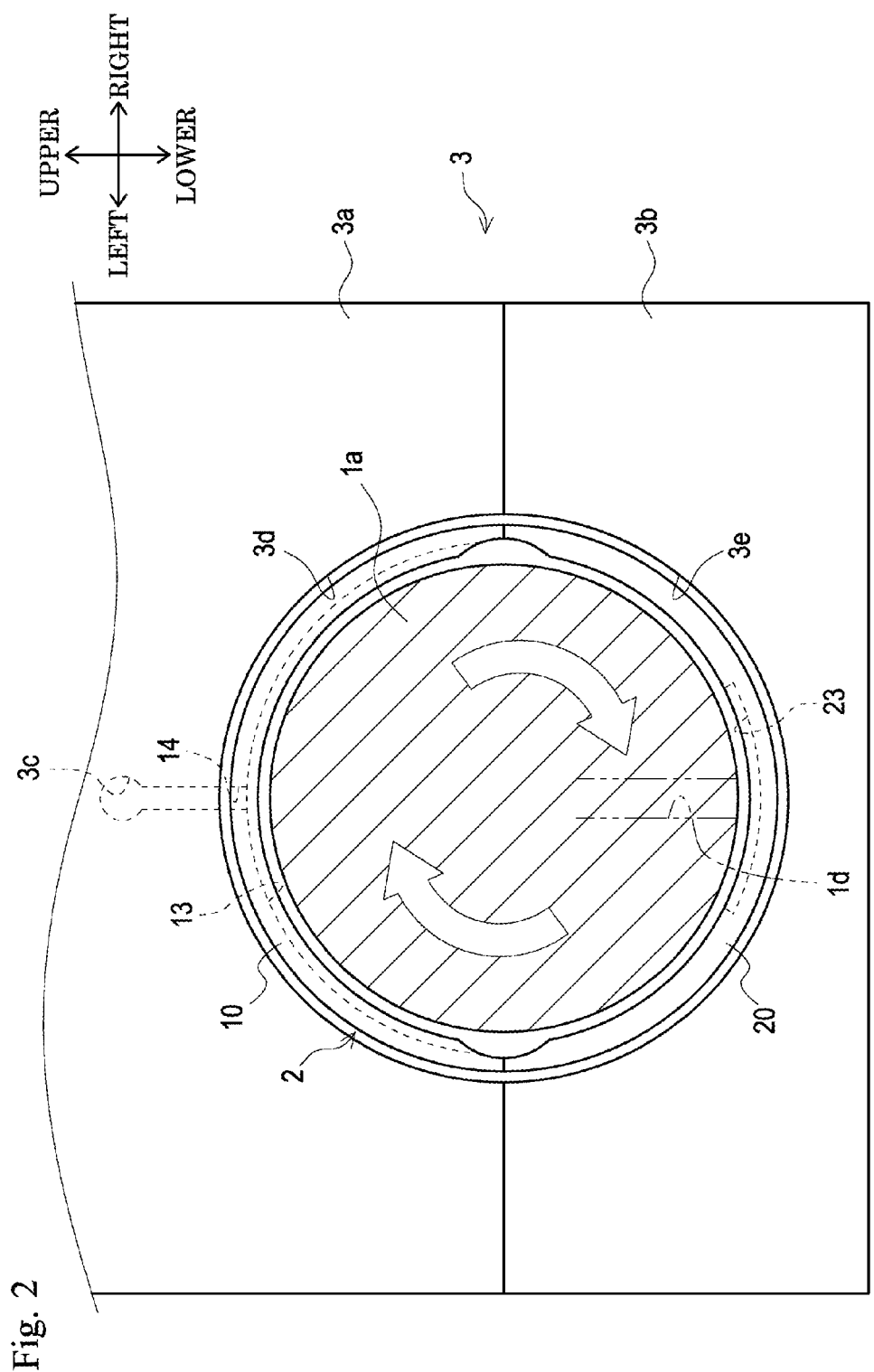
FIG. 2 is a front cross-sectional view showing a structure of a supporting portion of a crank journal.
Figure 3:
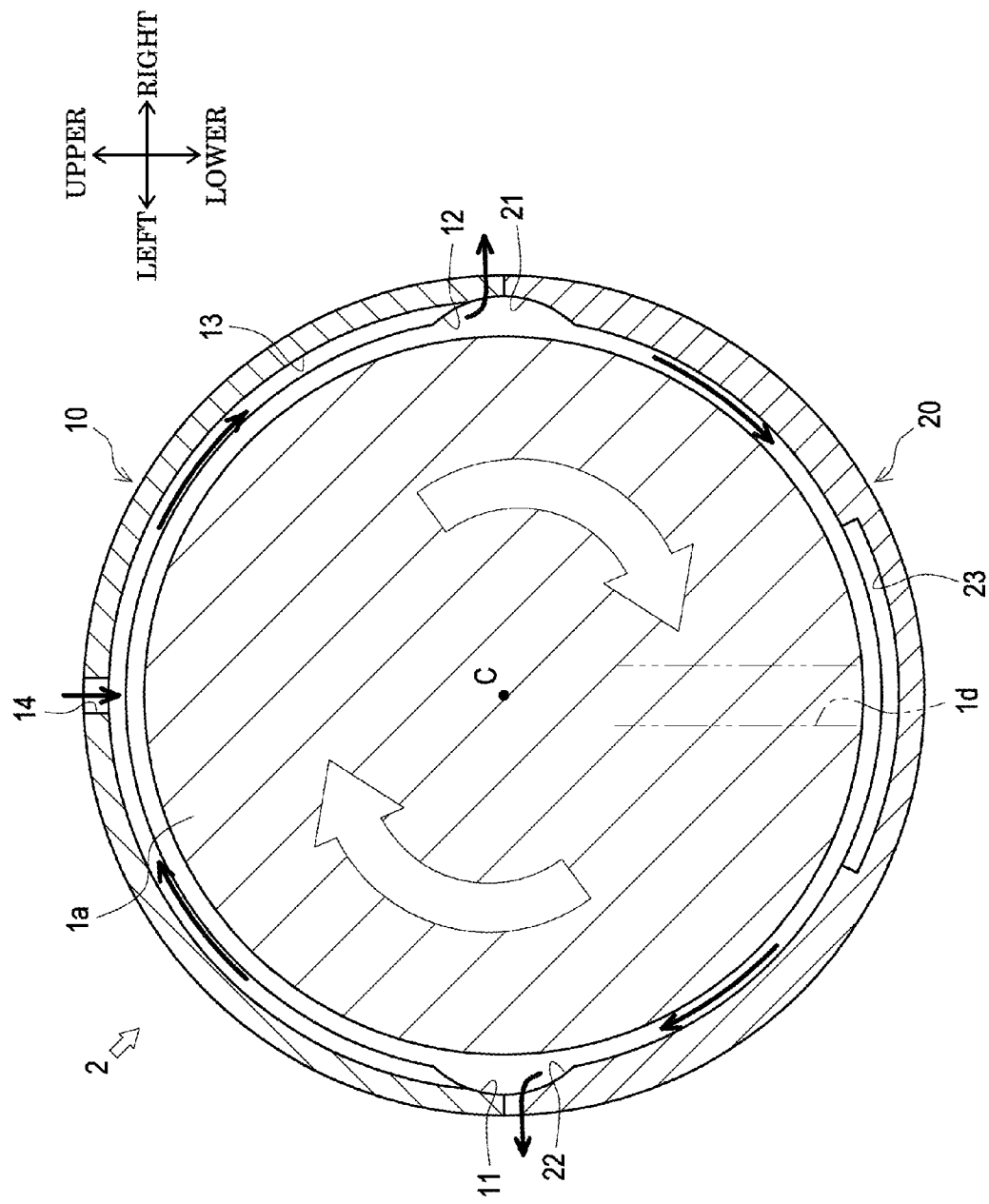
FIG. 3 is a front cross-sectional view showing a main bearing and the crank journal.

The main bearing 2 illustrated in FIGS. 2 and 3 is a cylindrical slide bearing for rotatably supporting the crank journal 1a. The main bearing 2 includes a pair of semi-cylindrical bearings (i.e., an upper bearing 10 and a lower bearing 20). The combination of the upper bearing 10 and the lower bearing 20 vertically opposed to each other provides a cylindrical main bearing 2.

Figure 4:
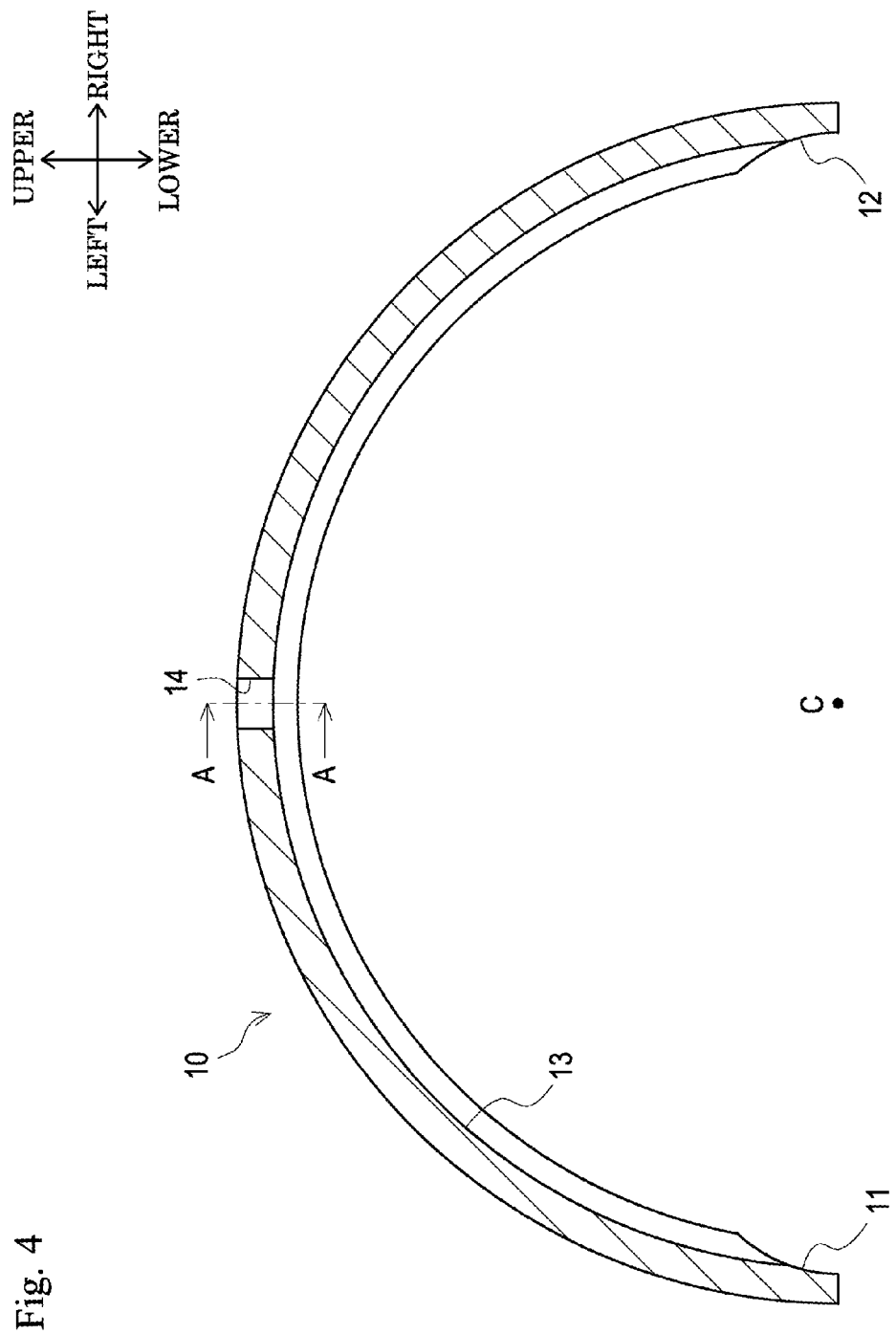
FIG. 4 is a front cross-sectional view showing an upper bearing.
Figure 6A:
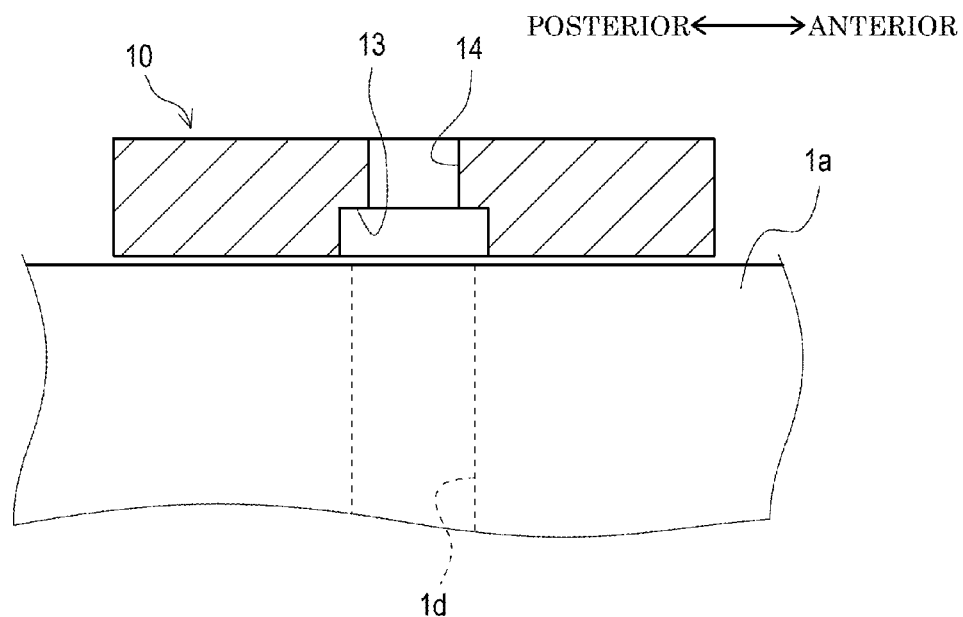
FIG. 6($a$) is a cross-sectional view taken along line A-A in FIG. 4, and FIG. 6($b$) is a cross-sectional view taken along line B-B in FIG. 5.

The upper bearing 10 illustrated in FIGS. 3, 4, and 6(a), which is an embodiment of an upper semi-cylindrical bearing according to the present invention, is a member forming the upper half of the main bearing 2. The upper bearing 10 is formed in a semi-cylindrical shape (i.e., a shape obtained by sectioning a cylinder with a diameter passing through its axis). The upper bearing 10 is disposed in the bearing portion 3d of the body-side housing 3a of the cylinder block 3 with the inner periphery of the upper bearing 10 facing downward (see FIG. 2). The upper bearing 10 mainly includes an upstream crush relief 11, a downstream crush relief 12, an oil groove 13, and the through-hole 14.

The upstream crush relief 11 and the downstream crush relief 12 illustrated in FIGS. 3 and 4 are portions formed by cutting away the inner periphery of the upper bearing 10 in a concave shape. The upstream crush relief 11 is formed at a lower left end (i.e., an upstream end in the rotation direction (hereinafter simply referred to as "upstream") of the crank journal 1a) of the upper bearing 10. The downstream crush relief 12 is formed at a lower right end (i.e., a downstream end in the rotation direction (hereinafter simply referred to as "downstream") of the crank journal 1a) of the upper bearing 10. Providing the upper bearing 10 with the upstream crush relief 11 and the downstream crush relief 12 can prevent the occurrence of failure (specifically, partial abutment of a deformed portion against the crank journal 1a) even if the upper bearing 10 is deformed in the vicinity of its both ends.

The oil groove 13 illustrated in FIGS. 3, 4, and 6(a) is to direct lubricant in the inner periphery of the upper bearing 10 and to store lubricant in the inner periphery in a suitable manner. The oil groove 13 is formed in the inner periphery of the upper bearing 10. The oil groove 13 is formed to extend in the circumferential direction of the upper bearing 10. One end (i.e., an upstream end) of the oil groove 13 communicates with the upstream crush relief 11. The other end (i.e., a downstream end) of the oil groove 13 communicates with the downstream crush relief 12. That is, the oil groove 13 is formed so that the upstream crush relief 11 communicates with the downstream crush relief 12.

The oil groove 13 is formed in the longitudinal center of the upper bearing 10 (see FIG. 6(a)). The oil groove 13 is formed to have a predetermined longitudinal width along its entire length. The oil groove 13 is also formed to have a predetermined depth along its entire length. Here, an opening of the communication oil passage 1d in the crank journal 1a is formed at the same longitudinal position as the oil groove 13. This allows lubricant in the oil groove 13 to be fed to the crank pin 1c (see FIG. 1) through the communication oil passage 1d when the opening of the communication oil passage 1d faces the oil groove 13 as the crank journal 1a rotates.

The through-hole 14, which is an embodiment of an oil feed hole according to the present invention, communicates between the inner periphery (more particularly, the oil groove 13) of the upper bearing 10 and the outer periphery thereof. The through-hole 14 is formed in the lateral center (i.e., the upper end) of the upper bearing 10.

Figure 5:
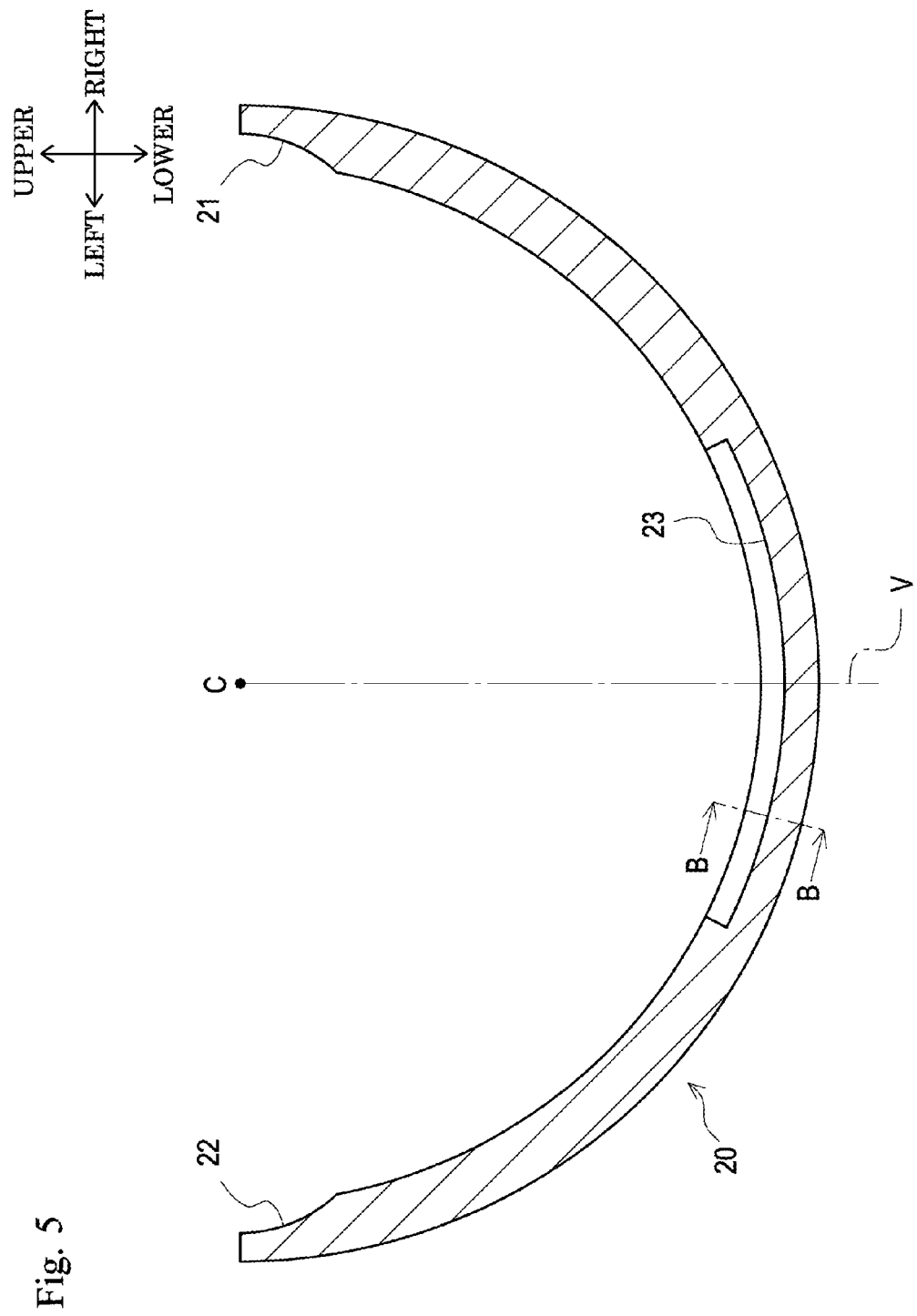
FIG. 5 is a front cross-sectional view showing a lower bearing.
Figure 6B:
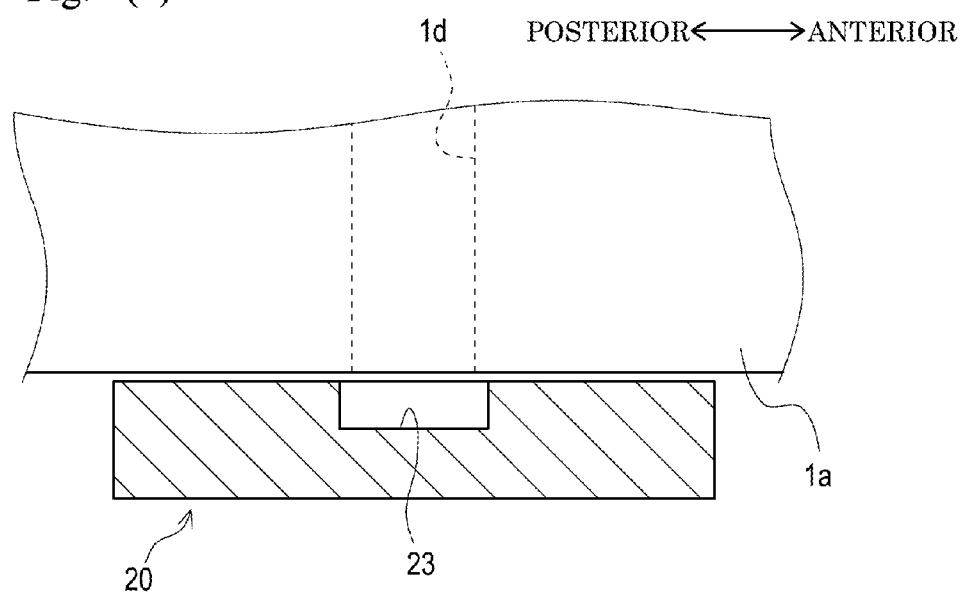

The lower bearing 20 illustrated in FIGS. 3, 5, and 6(b), which is an embodiment of a lower semi-cylindrical bearing according to the present invention, is a member forming the lower half of the main bearing 2. The lower bearing 20 is formed in a semi-cylindrical shape. The lower bearing 20 is disposed in the bearing portion 3e of the cap 3b of the cylinder block 3 with the inner periphery of the lower bearing 20 facing upward (see FIG. 2). The lower bearing 20 mainly includes an upstream crush relief 21, a downstream crush relief 22, and an oil groove 23.

The upstream crush relief 21 and the downstream crush relief 22 illustrated in FIGS. 3 and 5, which are an embodiment of lower crush reliefs according to the present invention, are portions formed by cutting away the inner periphery of the lower bearing 20 in a concave shape. The upstream crush relief 21 is formed at an upper right end (i.e., an upstream end) of the lower bearing 20. The downstream crush relief 22 is formed at an upper left end (i.e., a downstream end) of the lower bearing 20. Providing the lower bearing 20 with the upstream crush relief 21 and the downstream crush relief 22 can prevent the occurrence of failure (specifically, partial abutment of a deformed portion against the crank journal 1a) even if the lower bearing 20 is deformed in the vicinity of its both ends.

The oil groove 23 illustrated in FIGS. 3, 5, and 6(b) is to direct lubricant in the inner periphery of the lower bearing 20 and to store lubricant in the inner periphery in a suitable manner. The oil groove 23 is formed in the inner periphery of the lower bearing 20. The oil groove 23 is formed to extend in the circumferential direction of the lower bearing 20. The oil groove 23 is formed to extend over a predetermined range of the lower bearing 20. A range in which the oil groove 23 is formed is described below.

The oil groove 23 is formed in the longitudinal center of the lower bearing 20 (see FIG. 6(b)), and the oil groove 23 is formed to have a predetermined longitudinal width along its entire length. The oil groove 23 is also formed to have a predetermined depth along its entire length. Here, the opening of the communication oil passage 1d in the crank journal 1a is formed at the same longitudinal position as the oil groove 23. This allows lubricant in the oil groove 23 to be fed to the crank pin 1c (see FIG. 1) through the communication oil passage 1d when the opening of the communication oil passage 1d faces the oil groove 23 as the crank journal 1a rotates.

The flow of lubricant in the upper bearing 10 and the lower bearing 20 is described below with reference to FIG. 3.

Lubricant, which is externally fed to the inner periphery (oil groove 13) of the upper bearing 10 through the through-hole 14, passes downwardly through the oil groove 13 associated with gravity and rotation of the crank journal 1a. In particular, the crank journal 1a rotating clockwise as viewed from the front causes the lubricant to pass through the oil groove 13 in a clockwise direction as viewed from the front. Some of the lubricant passing through the oil groove 13 is fed to a sliding surface between the upper bearing 10 and the crank journal 1a to form an oil film on this sliding surface.

Part of the lubricant passing to the end (in particular, the downstream end) of the oil groove 13 is discharged outside the upper bearing 10 (main bearing 2) through the downstream crush relief 12. The remaining part of the lubricant is fed to the inner periphery of the lower bearing 20 through the downstream crush relief 12 and the upstream crush relief 21. The lubricant forms an oil film on a sliding surface between the lower bearing 20 and the crank journal 1a. The lubricant passes through the sliding surface between the lower bearing 20 and the crank journal 1a in a clockwise direction as viewed from the front as the crank journal 1a rotates. Some of the lubricant is fed to the oil groove 23 of the lower bearing 20. The lubricant in the oil groove 23 passes through the oil groove 23 in a clockwise direction as viewed from the front as the crank journal 1a rotates.

Part of the lubricant passing to the downstream end of the lower bearing 20 is discharged outside the lower bearing 20 (main bearing 2) through the downstream crush relief 22. The remaining part of the lubricant is fed to the inner periphery (oil groove 13) of the upper bearing 10 through the downstream crush relief 22 and the upstream crush relief 11.

A range in which the oil groove 23 of the lower bearing 20 is formed is described below with reference to FIGS. 7 and 8.

The oil groove 23 of the lower bearing 20 is formed in a range L (hereinafter referred to as a "low-load region") in which a pressure (load) from an oil film between the lower bearing 20 and the crank journal 1a is low on the inner periphery of the lower bearing 20. The low-load region can be preset by the experiment, numerical analysis, etc. A method for setting a low-load region L is described below.

There exist a number of methods for setting the low-load region L, so that a first setting method and a second setting method are described separately in the following description. Referring first to FIGS. 7 through 9, a first setting method for setting a low-load region L is described.

In the oil film between the crank journal 1a and the main bearing 2, a portion where the thickness of the oil film is thinnest (smallest) is formed as illustrated in FIG. 7 (the oil film of which portion is referred to as "minimum oil film hmin"). For the main bearing 2 supporting the crank journal 1a, the minimum oil film hmin is typically formed in the oil film on a side of the upper bearing 10. A position on the inner periphery of the upper bearing 10 corresponding to the portion in which the minimum oil film hmin is formed is defined as point P1. A thickness of the oil film is smallest in the portion of the minimum oil film hmin so that a pressure in the oil film is highest in the portion of the minimum oil film hmin.

For convenience of description, it is assumed in the present embodiment that the minimum oil film hmin is formed in the uppermost portion (i.e., the lateral center) of the upper bearing 10. That is, point P1 is located vertically above axis C.

Figure 8:
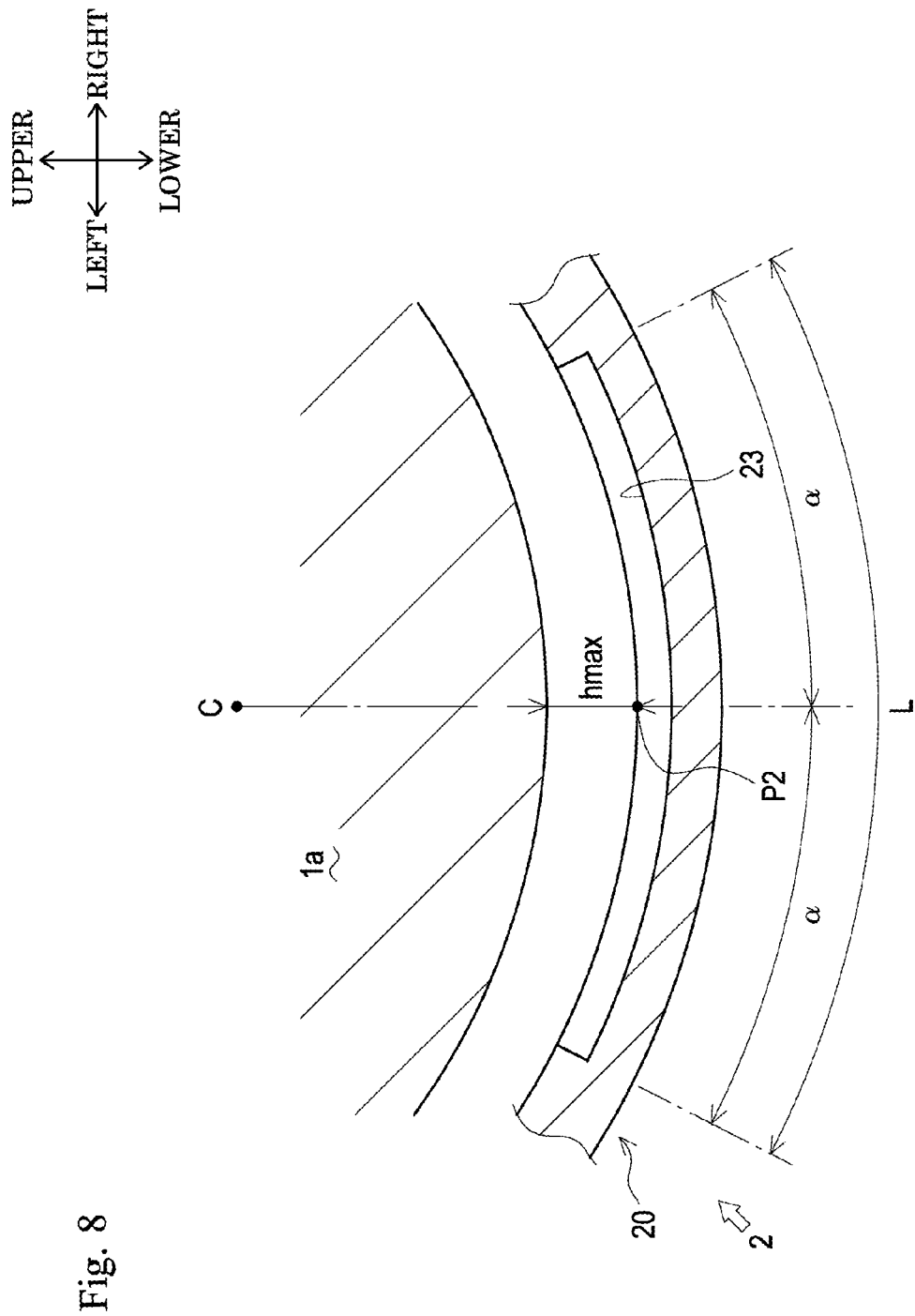
FIG. 8 is an enlarged front cross-sectional view showing the vicinity of a lower end of the lower bearing.
Figure 9:
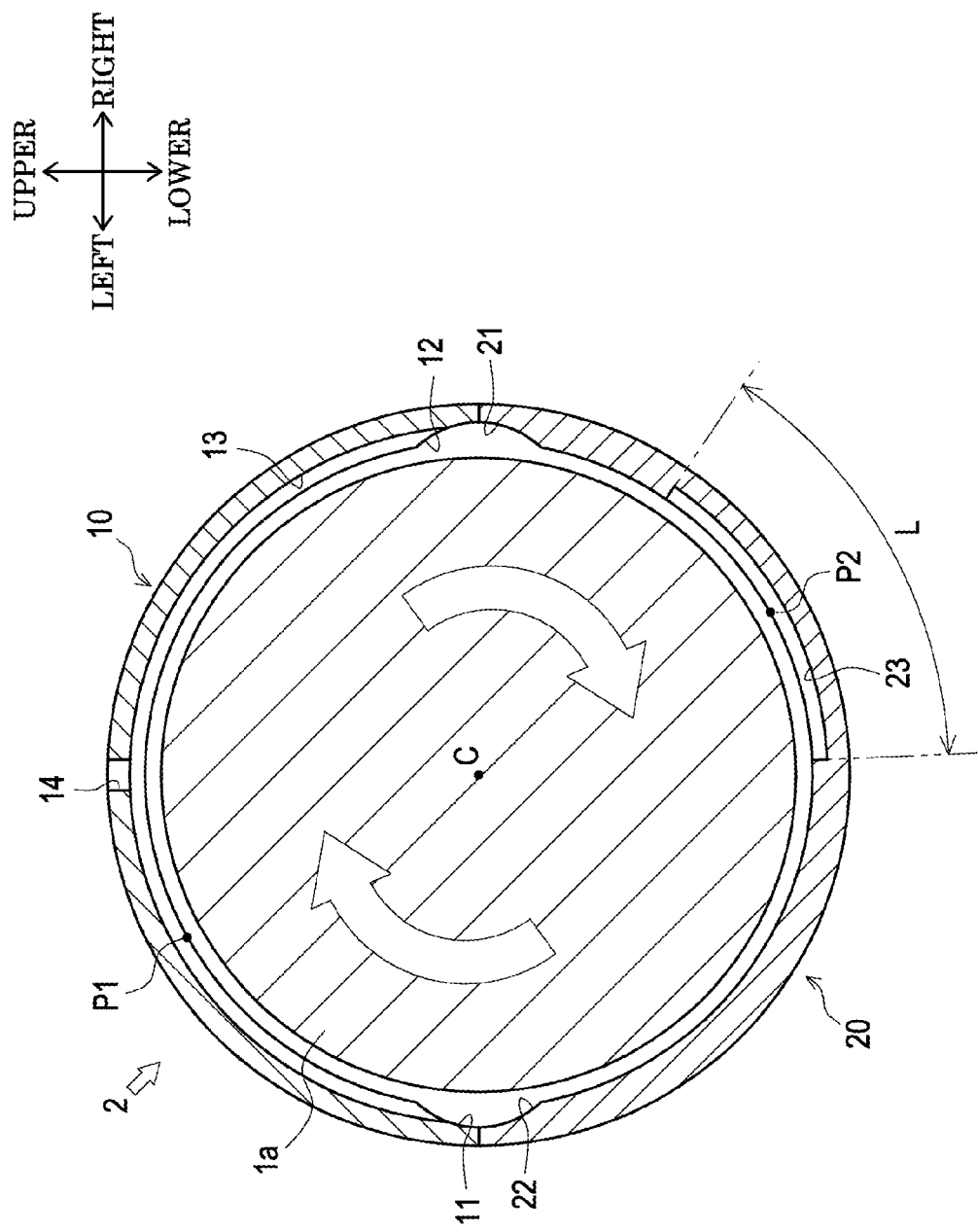
FIG. 9 is a front cross-sectional view of the main bearing and the crank journal, showing another example of setting a low-load region.

On the other hand, assuming point P2 is a position on the inner periphery of the lower bearing 20 that is 180-degree symmetrical to point P1 with respect to axis C (i.e., a position vertically below axis C on the inner periphery of the lower bearing 20), the thickness of the oil film (which is referred to as "maximum oil film hmax") of a portion corresponding to point P2 is thickest (greatest) when the minimum oil film hmin is formed in the upper bearing 10, as illustrated in FIG. 8. A thickness of the oil film is greatest in the portion of the maximum oil film hmax so that a pressure in the oil film is lowest in the portion of the maximum oil film hmax. That is, a pressure (load) that the main bearing 2 receives from the oil film is minimal at point P2.

In the present embodiment, a range within a predetermined angle α upstream and downstream with reference to point P2 is set as a low-load region L. Since the low-load region L is in the vicinity of point P2, the pressure (load) that the lower bearing 20 receives from the oil film in the low-load region L is considered to be relatively low.

The predetermined angle α may be appropriately set. However, a thickness of the oil film decreases and a pressure in the oil film increases as a point approaches from point P2 to point P1. Accordingly, it is desirable for the predetermined angle α to be set within 90 degrees (that is, the low-load region L may range within ±90 degrees with reference to (or about) point P2).

In the present embodiment, the oil groove 23 is formed in the low-load region L set in this way. Specifically, the oil groove 23 is formed to extend from an upstream end of the low-load region L to a downstream end (i.e., to extend over the entire length of the low-load region L).

Forming such an oil groove 23 reduces a surface area of the lower bearing 20 for receiving the crank journal 1a. When the surface area for receiving the crank journal 1a is reduced, the remaining surface will generally be subjected to high pressure (load) and there may be a likelihood of the occurrence of galling.

However, the lower bearing 20 is not subjected to high pressure (pressure of the oil film) in the low-load region L, which does not significantly adversely affect the function of supporting the crank journal 1a even if the oil groove 23 is formed. Thus, forming the oil groove 23 in the low-load region L prevents or reduces the likelihood of the occurrence of galling.

As described above, the main bearing 2 (slide bearing) according to the present embodiment is a cylindrical bearing that is formed by combining the upper bearing 10 (upper semi-cylindrical bearing) disposed on the upper side and the lower bearing 20 (lower semi-cylindrical bearing) disposed on the lower side and rotatably supports the crank journal 1a (shaft member) through the oil film between the cylindrical bearing and the crank journal 1a. The lower bearing 20 includes the oil groove 23 formed in the low-load region L set in a range in which a pressure from the oil film is low on the inner periphery of the lower bearing 20.

Such a configuration, forming the oil groove 23 in the low-load region L, can prevent or reduce the likelihood of the occurrence of galling.

The low-load region L is also set in a range within a predetermined angle $\alpha$ upstream and downstream in the rotation direction of the crank journal 1a with reference to a position that is 180-degree symmetrical to a position at which a thickness of the oil film between the inner periphery of the upper bearing 10 and the crank journal 1a is smallest with respect to axis C of the main bearing 2.

Such a configuration allows the low-load region L to be set at an appropriate position (that is, a position at which the pressure of the oil film is relatively low).

For convenience of description, point P1 is located in the uppermost portion (i.e., vertically above axis C) of the upper bearing 10 in the above-mentioned first setting method, the present invention is not limited thereto. For example, as illustrated in FIG. 9, if it was found by experiment etc. that a position (point P1) at which the minimum oil film hmin is formed is displaced from the uppermost portion of the upper bearing 10 to the right or left, a position that is 180-degree symmetrical to the above point P1 with respect to axis C is defined as point P2. The low-load region L can be set with reference to point P2 accordingly.

While FIGS. 7 to 9 show examples in which the oil groove 23 does not communicate with the upstream crush relief 21 and the downstream crush relief 22, the present invention is not limited thereto. The oil groove 23 may communicate with the upstream crush relief 21 and the downstream crush relief 22.

Furthermore, while a range within the same angle (i.e., predetermined angle $\alpha$) upstream and downstream with reference to point P2 is set as the low-load region L in the first setting method, the present invention is not limited thereto. Angles upstream and downstream from point P2 can be different values.

Figure 10:
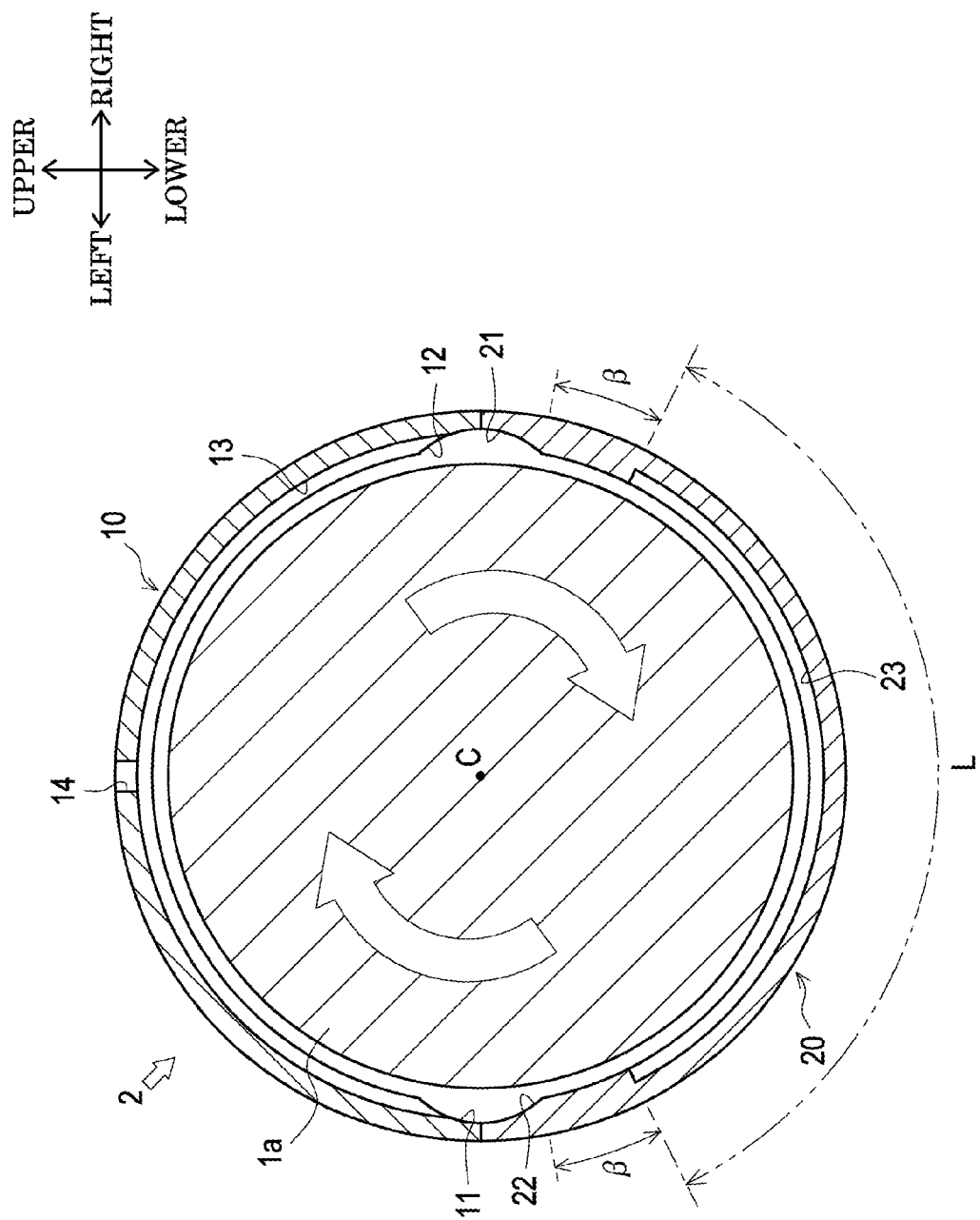
FIG. 10 is a front cross-sectional view of the main bearing and the crank journal, showing an example of setting a low-load region by using a second setting method.

Referring now to FIG. 10, a second setting method for setting a low-load region L is described.

As described in the first setting method, the minimum oil film hmin is typically formed in the oil film on the side of the upper bearing 10. A predetermined range on the inner periphery of the lower bearing 20 is set as a low-load region L in the second setting method accordingly.

Specifically, the low-load region L is set such that it extends from a position spaced apart by a predetermined angle $\beta$ downstream from the upstream crush relief 21 to a position spaced apart by a predetermined angle $\beta$ upstream from the downstream crush relief 22. Specifically, the predetermined angle $\beta$ is preferably set to 16 degrees or more.

In the present embodiment, the oil groove 23 is formed in the low-load region L set in this way. Specifically, the oil groove 23 is formed to extend from an upstream end of the low-load region L to a downstream end (i.e., to extend over the entire length of the low-load region L). Forming the oil groove 23 in the low-load region L prevents or reduces the likelihood of the occurrence of galling.

As described above, the low-load region L is set in a range that is spaced apart from the upstream crush relief 21 and the downstream crush relief 22 (i.e., lower crush reliefs) formed at both ends of the inner periphery of the lower bearing 20 by 16 degrees or more about axis C of the main bearing 2.

Such a configuration allows the low-load region L to be set at an appropriate position (i.e., a position at which the pressure of the oil film is relatively low).

While the low-load region L is set, in the second setting method, with reference to the positions spaced apart from the upstream crush relief 21 and the downstream crush relief 22 by the same angle (i.e., predetermined angle ($\beta$), the present invention is not limited thereto. An angle from the upstream crush relief 21 and an angle from the downstream crush relief 22 can be different values.

Figure 11:
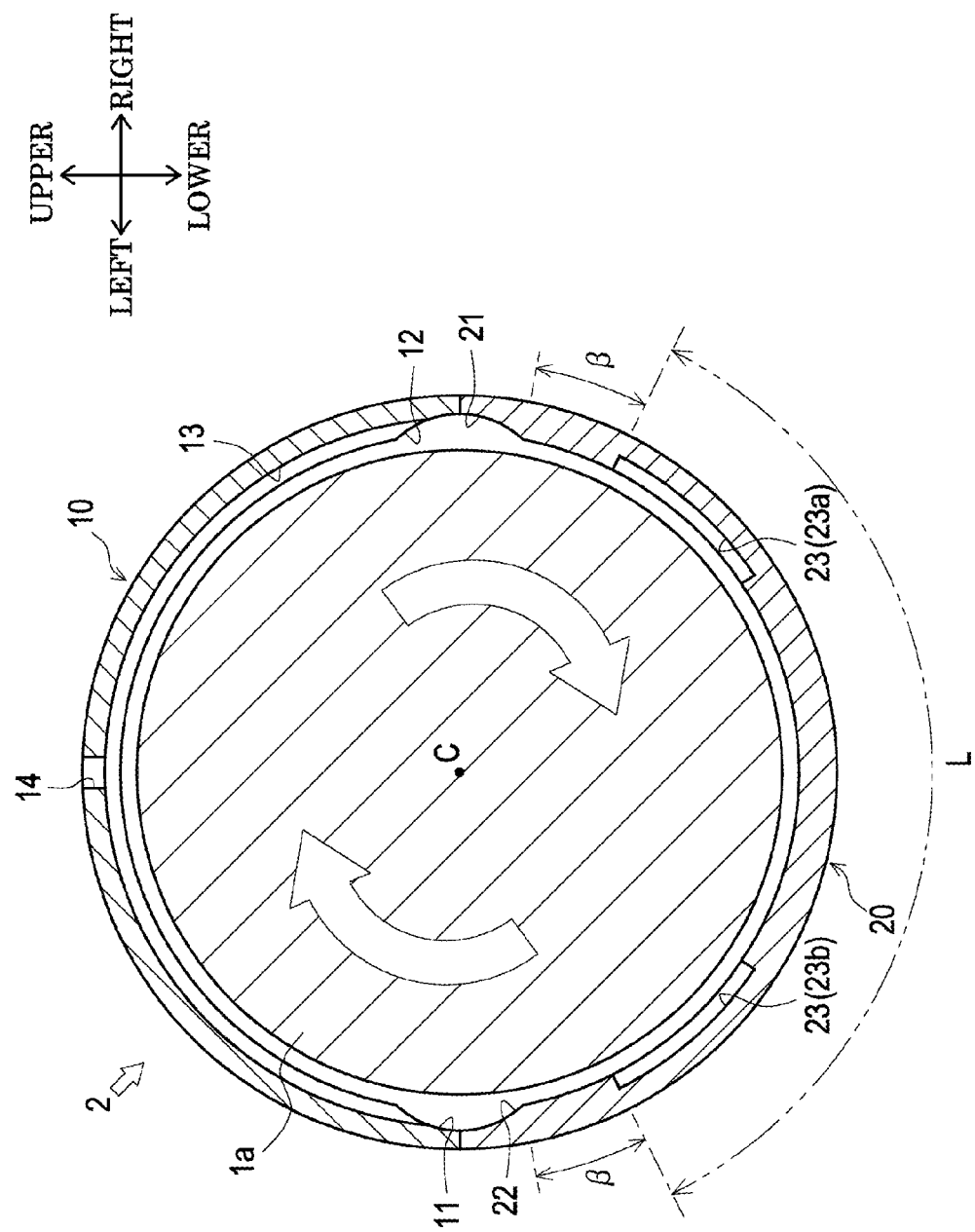
FIG. 11 is a front cross-sectional view of the main bearing and the crank journal, showing still another example of setting a low-load region.

Moreover, while the oil groove 23 is formed to extend over the entire length of the low-load region L in the first and second setting methods, the present invention is not limited thereto. That is, the oil groove 23 can be formed in only part of the low-load region L set. A plurality of oil grooves 23 may also be formed in the low-load region L set, as illustrated in FIG. 11. FIG. 11 illustrates an example in which two oil grooves 23 (upstream oil groove 23a and downstream oil groove 23b) are formed.

While the present embodiment shows an example of applying the slide bearing according to the present invention to the main bearing 2 for rotatably supporting the crank journal 1a, the present invention is not limited thereto. That is, the present invention is also applicable to other slide bearings (e.g., to the connecting rod bearing 4 interposed between the crank pin 1c and the connecting rod 5).

INDUSTRIAL APPLICABILITY

The present invention is applicable to a cylindrical slide bearing that is formed by combining a pair of semi-cylindrical bearings and rotatably supports a shaft member.

The invention claimed is:
1. An internal combustion engine comprising a shaft member and a slide bearing supporting the shaft member, the slide bearing having a cylindrical shape, comprising an upper semi-cylindrical bearing disposed on an upper side and a lower semi-cylindrical bearing disposed on a lower side in combination,
   the slide bearing rotatably supporting the shaft member through an oil film between the slide bearing and the shaft member, wherein
   the lower semi-cylindrical bearing comprises an oil groove formed on an inner periphery of the lower semi-cylindrical bearing so as to extend in the circumferential direction of the lower semi-cylindrical bearing, the oil groove having two ends,
   each of the ends of the oil groove is formed at a position that is spaced apart from lower crush reliefs formed at both ends of the inner periphery of the lower semi-cylindrical bearing by 16 degrees or more about an axis of the slide bearing.

\* \* \* \* \*